United States Patent
Strandborg

(10) Patent No.: US 12,388,971 B1
(45) Date of Patent: Aug. 12, 2025

(54) AUTOMATED CALIBRATION OF MULTISCOPIC DISPLAYS

(71) Applicant: Distance Technologies Oy, Helsinki (FI)

(72) Inventor: Mikko Strandborg, Hangonkylä (FI)

(73) Assignee: Distance Technologies Oy, Helsinki (FI)

( * ) Notice: Subject to any disclaimer, the term of this patent is extended or adjusted under 35 U.S.C. 154(b) by 0 days.

(21) Appl. No.: 19/190,945

(22) Filed: Apr. 28, 2025

(51) Int. Cl.
*H04N 13/327* (2018.01)
*H04N 13/32* (2018.01)
*H04N 13/324* (2018.01)
*H04N 13/398* (2018.01)

(52) U.S. Cl.
CPC ........... *H04N 13/327* (2018.05); *H04N 13/32* (2018.05); *H04N 13/324* (2018.05); *H04N 13/398* (2018.05)

(58) Field of Classification Search
CPC .... H04N 13/327; H04N 13/32; H04N 13/324; H04N 13/398
USPC ............................................................ 348/51
See application file for complete search history.

(56) References Cited

U.S. PATENT DOCUMENTS

| | | | |
|---|---|---|---|
| 11,546,571 B1* | 1/2023 | Lin | H04N 13/282 |
| 2025/0104580 A1* | 3/2025 | Melax | G06T 11/00 |

FOREIGN PATENT DOCUMENTS

| | | | | |
|---|---|---|---|---|
| CN | 108633333 B | * | 6/2020 | H04N 23/00 |
| WO | WO-2025080479 A1 | * | 4/2005 | H04N 13/327 |

* cited by examiner

*Primary Examiner* — Behrooz M Senfi
(74) *Attorney, Agent, or Firm* — Ziegler IP Law Group LLC.

(57) ABSTRACT

An optical location of camera(s) relative to a display area of a multiscopic display is detected or retrieved. Another optical location is selected, the another optical location being offset from the optical location of the camera(s) by a given angular interpupillary distance. An estimated pitch of a multiscopic optical element is selected. A first image and a second image are obtained, wherein the first image has first colour(s), and the second image has second colour(s) being different from the first colour(s). A multiscopic image is generated, based on the estimated pitch. The multiscopic image is displayed, whilst capturing image(s) of the display area. A correct pitch of the multiscopic optical element is determined, based on an interference pattern represented in the image(s).

19 Claims, 4 Drawing Sheets

AUTOMATED CALIBRATION OF MULTISCOPIC DISPLAYS

TECHNICAL FIELD

The present disclosure relates to systems for automated calibration of multiscopic displays. The present disclosure also relates to methods for automated calibration of multiscopic displays.

BACKGROUND

Multiscopic displays are widely used in applications such as three-dimensional (3D) visualisation, augmented reality (AR), virtual reality (VR), and automotive heads-up displays (HUDs). A multiscopic display often relies on a precise alignment between a multiscopic optical element (for example, a lenticular array or a parallax barrier) of the multiscopic display and an underlying pixel array of the multiscopic display to present high-quality images to different eyes of a user.

However, calibration of such multiscopic displays is a critical and challenging process. Typically, the calibration of the multiscopic displays is performed manually, requiring skilled operators to align the multiscopic optical element with the pixel array. This process is time-consuming, labour-intensive, and prone to human error. Additionally, the calibration tends to drift over time due to factors such as thermal expansion, mechanical stress, or environmental changes, necessitating frequent re-calibration to maintain optimal performance of the multiscopic displays.

Some existing techniques for calibrating the multiscopic displays utilise test patterns and manual adjustments. For example, operators visually inspect interference patterns caused by a misalignment between the multiscopic optical element and the underlying pixel array, and adjust settings of the multiscopic optical element accordingly. While this approach can achieve acceptable results, it is not scalable for mass production or real-time re-calibration in dynamic environments.

Additionally, such manual calibration lacks the precision required for advanced applications, such as automotive displays or AR/VR systems, where even minor misalignments results in significant visual artifacts, such as crosstalk, ghosting, or incorrect depth perception, which deteriorates an overall viewing experience of users.

Therefore, in light of the foregoing discussion, there exists a need to overcome the aforementioned drawbacks.

SUMMARY

The present disclosure seeks to provide a system and a method for automated calibration of a multiscopic display. The aim of the present disclosure is achieved by a system and a method which enable automated calibration of a multiscopic display, by iteratively determining and refining calibration parameters, for example, such as a pitch of the multiscopic optical element of the multiscopic display, based on an interference pattern, in real time or near-real time, thereby eliminating manual intervention and ensuring high accuracy, scalability, and reliability of the multiscopic display, as defined in the appended independent claims to which reference is made to. Advantageous features are set out in the appended dependent claims.

Throughout the description and claims of this specification, the words "comprise", "include", "have", and "contain" and variations of these words, for example "comprising" and "comprises", mean "including but not limited to", and do not exclude other components, items, integers or steps not explicitly disclosed also to be present. Moreover, the singular encompasses the plural unless the context otherwise requires. In particular, where the indefinite article is used, the specification is to be understood as contemplating plurality as well as singularity, unless the context requires otherwise.

BRIEF DESCRIPTION OF THE DRAWINGS

FIG. 3A illustrates a simplified example of an image of a display area of a multiscopic display, while

DETAILED DESCRIPTION OF EMBODIMENTS

Figure 1:
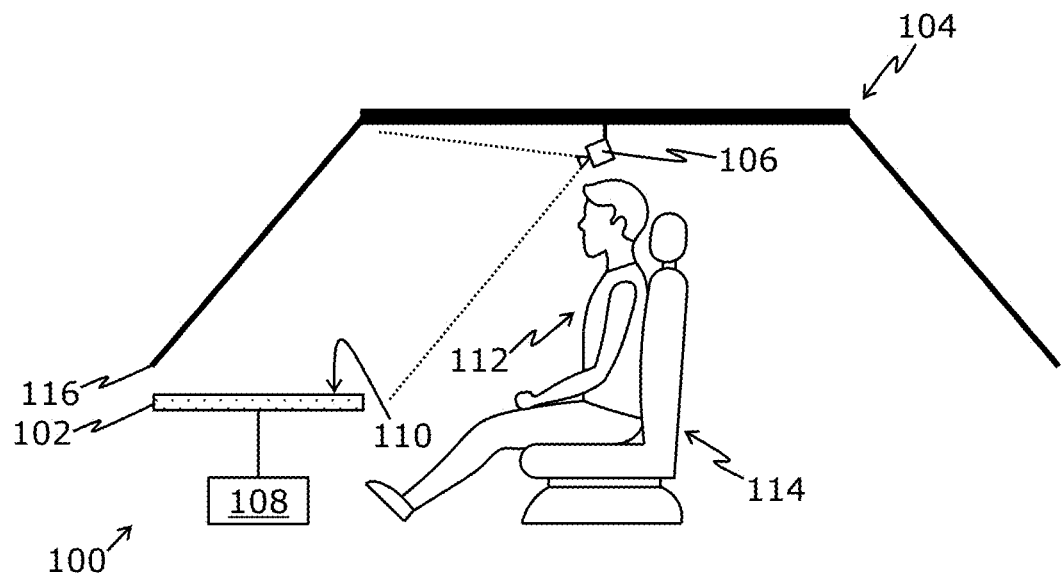
FIG. 1 illustrates a simplified example implementation of a system for automated calibration of a multiscopic display, in accordance with an embodiment of the present disclosure.

The following detailed description illustrates embodiments of the present disclosure and ways in which they can be implemented. Although some modes of carrying out the present disclosure have been disclosed, those skilled in the art would recognize that other embodiments for carrying out or practising the present disclosure are also possible.

In a first aspect, an embodiment of the present disclosure provides a system comprising:
  a multiscopic display;
  at least one camera that is positioned such that a display area of the multiscopic display lies within a field of view of the at least one camera at least partially; and
  at least one processor configured to:
    detect or retrieve an optical location of the at least one camera relative to the display area;
    select another optical location that is offset from the optical location of the at least one camera by a given angular interpupillary distance; select an estimated pitch of a multiscopic optical element of the multiscopic display;
    obtain a first image and a second image to be presented to a first viewer and a second viewer, wherein the first image has at least one first colour, and the second image has at least one second colour that is different from the at least one first colour;
    generate a multiscopic image from the first image and the second image, based on the estimated pitch, by considering the optical location and the another optical location as respective locations of the first viewer and the second viewer;
    display the multiscopic image via the multiscopic display, whilst capturing at least one image of the display area using the at least one camera; and determine a correct pitch of the multiscopic optical element, based on an interference pattern represented in the at least one image.

In a second aspect, an embodiment of the present disclosure provides a method comprising:

detecting or retrieving an optical location of at least one camera relative to a display area of a multiscopic display, wherein the at least one camera is positioned such that the display area of the multiscopic display lies within a field of view of the at least one camera at least partially;

selecting another optical location that is offset from the optical location of the at least one camera by a given angular interpupillary distance;

selecting an estimated pitch of a multiscopic optical element of the multiscopic display;

obtaining a first image and a second image to be presented to a first viewer and a second viewer, wherein the first image has at least one first colour, and the second image has at least one second colour that is different from the at least one first colour;

generating a multiscopic image from the first image and the second image, based on the estimated pitch, by considering the optical location and the another optical location as respective locations of the first viewer and the second viewer;

displaying the multiscopic image via the multiscopic display, whilst capturing at least one image of the display area using the at least one camera; and determining a correct pitch of the multiscopic optical element, based on an interference pattern represented in the at least one image.

The present disclosure provides the aforementioned system and the aforementioned method that offer several technical benefits over the prior art in terms of calibrating multiscopic displays. First, unlike existing manual calibration techniques that are time-consuming and require operator skill, the system and the method of the present disclosure iteratively and automatically determine the correct pitch of the multiscopic optical element using the estimated pitch and the (corresponding) interference pattern captured in the at least one image, thereby eliminating the need for human intervention. This results in significantly reduced calibration time and improved accuracy, even in scenarios where calibration drifts over time due to factors, for example, such as a thermal expansion of the multiscopic display, the multiscopic display being exposed to a mechanical stress, and the like. Second, by eliminating the need for human intervention, the system and the method ensure a scalable and repeatable calibration process, making it particularly well-suited for mass production of the multiscopic displays. For example, the system can be seamlessly integrated into factory calibration procedures, enabling efficient and consistent set-up of the multiscopic displays at scale. Third, the system and the method leverage software-based corrections, offering exceptional flexibility to accommodate a wide range of display configurations for calibration purposes. Additionally, through a precise analysis of interference patterns, the at least one processor can detect and correct even minute calibration errors with high accuracy. Fourth, the system and the method are susceptible to achieve the aforesaid technical benefits with minimal hardware requirements. For example, an existing tracking camera can be utilised for an image capturing operation and any standard processor can be used for executing processing steps of the method, thereby eliminating the need for any specialised hardware. This also reduces costs and simplifies a practical implementation of the system, making it accessible for diverse applications, for example, such as automotive heads-up displays, augmented-reality displays, and the like. Together, these technical benefits provide a robust, cost-effective, and fully-automated real time calibration solution, improving the reliability, scalability, usability, and performance of the multiscopic displays, whilst reducing their operational complexity.

It will be appreciated that it is important to calibrate the multiscopic displays because their performance and visual quality output depend heavily on a precise alignment of the multiscopic optical element with an underlying pixel array of the multiscopic display. Any misalignment can result into visual artifacts such as interference patterns, incorrect depth perception, or reduced image clarity, which degrade an overall viewing experience of users. Thus, the calibration of the multiscopic displays ensures that the multiscopic displays produce accurate multiscopic images, providing an intended three-dimensional (3D) effect (namely, a depth perception) or multi-view functionality without any visual distortions. This significantly improves the overall viewing experience of the users.

For illustration purposes, there will now be described how the system and the method work to achieve the aforementioned technical benefits. In operation, the aforementioned steps can be performed as follows:

1. The optical location of the at least one camera relative to the display area is detected or retrieved. In this regard, in some implementations, the optical location of the at least one camera is detected or retrieved by utilising a tracker. Such trackers are well-known in the art. In other implementations, the optical location of the at least one camera is retrieved from a data repository, wherein a plurality of optical locations of the at least one camera relative to the display area are pre-detected and pre-stored at said data repository. The data repository could, for example, be implemented as a memory of the at least one processor, a memory of the tracker, a memory of a computing device, a removable memory, a cloud-based database, or the like. Examples of the computing device include, but are not limited to, a laptop, a tablet, a phablet, and a smartphone.

Throughout the present disclosure, the term "optical location" refers to a position of the at least one camera wherefrom light emitted by the display area of the multiscopic display is captured by the at least one camera in a manner equivalent to how the light would be perceived by a user's eyes located at a same position as that of the at least one camera. Thus, it can be understood that the optical position serves as a reference point for simulating a perspective of the user's eyes relative to the display area, during the calibration of the multiscopic display. Optionally, a given optical location is represented in a given coordinate space. As an example, the given coordinate space may be a Cartesian coordinate space. The term "given optical location" encompasses the optical location and the another optical location of the at least one camera.

It will be appreciated that the field of view of the at least one camera encompasses both a direct field of view and a reflected field of view. This means that the at least one camera is capable of capturing images of the display area directly and/or through a reflective surface. In scenarios where the display area is directly visible to the at least one camera without any reflective surface in the optical path, the direct field of view allows the at least one camera to capture the images of the display area directly. This, for example, is applicable where the multiscopic display is implemented as a transparent display. In scenarios where the display area is visible to the at least one camera through a reflective surface, for example, such as a semi-reflective surface of an optical combiner, the reflected field of view allows the at least one camera to capture the images of the display area indirectly. Further, in scenarios where the display area is visible to the at least one camera both directly and through the reflective surface, the direct field of view allows to capture the display area as-is, while the reflected field of view allows to capture the display area in a reflected manner. In such scenarios, the at least one image would represent both direct and reflected views of the display area. It will be appreciated that when the field of view of the at least one camera is the direct field of view, the optical location of the at least one camera is understood to be a relative location of the at least one camera without considering the reflective surface. On the other hand, when the field of view of the at least one camera is the reflected field of view, the optical location of the at least one camera is understood to be relative to the reflective surface.

2. The another optical location is selected, wherein the another optical location is offset from the optical location of the at least one camera by the given angular interpupillary distance. In this regard, when the given angular interpupillary distance is known, the at least one processor can transform an angular offset indicated by the given angular interpupillary distance into a linear offset in the given coordinate space, and then calculate coordinates of the another optical location by adding the linear offset to coordinates of the given optical location.

It will be appreciated that the given angular interpupillary distance could be determined as an angular interpupillary distance of a user positioned at a given viewing distance from the display area, the given viewing distance being measured along an optical path of the multiscopic display. Moreover, an average interpupillary distance of the user remains the same, but the angular interpupillary distance of the user changes with a change in the given viewing distance from the display area. This is because an angular separation between respective gaze directions of eyes of the user from a perspective of a point on the display area increases as the given viewing distance decreases. In other words, when the user is closer to the display area (namely, when the given viewing distance is lesser), an angle subtended by the respective gaze directions of the eyes of the user at the point on the display area is larger, as compared to a case when the user is far from the display area (namely, when the given viewing distance is large). It is noteworthy that, in such a case, the aforementioned steps of the method can be repeatedly performed for different viewing distances.

3. The estimated pitch of the multiscopic optical element is selected. In this regard, a value of the estimated pitch is a closest possible guess for the correct pitch and thus it is off from a likely correct pitch. When the estimated pitch is off from the likely correct pitch, an interference pattern is generated when the multiscopic image is displayed. It will be appreciated that the estimated pitch does not necessarily have to be knowingly off from the correct pitch during the calibration process. When the estimated pitch happens to be correct from the beginning (i.e., when the closest possible guess is correct in a first go only), no interference pattern would be generated. In such a case, the calibration process is not required to be performed. However, even in this scenario, it is important for the system to verify that the estimated pitch is indeed correct. This verification ensures that an absence of the interference pattern is not due to other factors (for example, errors in image capturing or image processing), but genuinely because the estimated pitch is already correct. This verification step is critical to confirm that no further calibration for the pitch is needed. It is noteworthy that typically, the correct pitch of the multiscopic optical element is not highly accurately known, for example, due to measurement inaccuracies arising from its extremely small magnitude. Therefore, the estimated pitch is initially selected as the closest possible guess, and then iteratively refined towards the correct value, based on analyses of interference patterns.

It will be appreciated that the term "pitch" of the multiscopic optical element can be defined depending on how the multiscopic optical element is implemented. The pitch of the multiscopic optical element determines how a multiscopic image is split and directed towards different viewing angles. In a case, when the multiscopic optical element is implemented as a lenticular array, the pitch is a centre-to-centre distance between adjacent lenticules (for example, individual cylindrical lenses). In another case, when the multiscopic optical element is implemented as a parallax barrier, the pitch is a centre-to-centre distance between adjacent transparent slits in the parallax barrier.

4. The first image and the second image are obtained for presenting to the first viewer and the second viewer, respectively. The first image has the at least one first colour, and the second image has the at least one second colour that is different from the at least one first colour. In this regard, in some implementations, the at least one processor is configured to obtain the first image and the second image from the data repository whereat the first image and the second image are pre-stored. In other implementations, the at least one processor is configured to generate the first image and the second image from perspectives of locations of the first viewer and the second viewer, respectively. It will be appreciated that the term "viewer" encompasses at least one of: an eye of the user, a camera.

In a first implementation, the at least one first colour is one of a white colour and a black colour, and the at least one second colour is another of the white colour and the black colour. In this regard, when the at least one first colour is the white colour and the at least one second colour is the black colour, the first image has the white colour and the second image has the black colour. Conversely, when the at least one first colour is the black colour and the at least one second colour is the white colour, the first image has the black colour and the second image has the white colour. A technical benefit of this implementation is that it results in generation of a clear and high-contrast interference pattern when the multiscopic image is displayed. A high contrast between the white colour and the black colour enhances a visibility of the interference pattern, making it easier for the at least one processor to analyse the interference pattern and determine calibration parameters, for example, such as the correct pitch of the multiscopic optical element with high accuracy and reliability, without any human intervention.

In a second implementation, the at least one second colour includes two or more second colours, wherein a central portion of the second image has one of the two or more second colours, while a remaining portion of the second image has a remainder of the two or more second colours. Similarly, in a third implementation, the at least one first colour includes two or more first colours, wherein a central portion of the first image has one of the two or more first colours, while a remaining portion of the first image has a remainder of the two or more first colours. In an example, the second image may have a black colour and a green colour, wherein the central portion of the second image has the green colour, while the remaining portion of the second image has the black colour (or vice versa). The central portion of the second image can be shaped as a circle positioned at a centre of the second image, or it can be horizontally central, such as a central vertical stripe dividing the second image into three vertical stripes. Similarly, the first image may have a white colour and a red colour, wherein the central portion of the first image has the red colour, while the remaining portion of the first image has the white colour (or vice versa). A technical benefit of any or both of these implementations is that they further enhance an ability of the at least one processor to detect and analyse complex interference patterns generated under various conditions, improving an overall accuracy and reliability of the calibration process. For example, the use of multiple colours allow the at least one processor to determine a centre of a first part of an interference beat (in the interference pattern) having the one of the two or more first colours with high accuracy. By using two or more colours in the first image and/or the second image, and by defining the central portion of the first image and/or the central portion of the second image with a specific colour, the generated interference pattern would comprise distinct visual cues that enable the at least one processor to precisely identify the interference beat and the centre of its first part. This is particularly beneficial for determining calibration parameters, for example, such as a correct phase of the multiscopic optical element relative to the pixel array of the multiscopic display, as described later.

5. The multiscopic image is generated from the first image and the second image, based on the estimated pitch, by considering the optical location and the another optical location as respective locations of the first viewer and the second viewer. The generation of the multiscopic image in this manner ensures that the system simulates a viewing experience of the first viewer and the second viewer (for example, both eyes of the user) positioned at the optical location and the another optical location, respectively. Additionally, using the estimated pitch (that is deliberately off from the likely correct pitch) as a basis for generating the multiscopic image enables in generating the interference pattern, when the multiscopic image is displayed. The step of generating the multiscopic image from the first image and the second image can be performed using any suitable well-known technique.

6. The multiscopic image is displayed via the multiscopic display, whilst the at least one image of the display area is captured using the at least one camera. In this regard, when the multiscopic image is displayed, the interference pattern appears on the display area of the multiscopic display as a result of the estimated pitch being incorrect. Positioning the at least one camera in a manner that the display area lies at least partially within the field of view of the at least one camera enables in capturing the at least one image of the display area, the at least one image representing the interference pattern. An exemplary image captured by the at least one camera has been illustrated in conjunction with FIG. 3A, for sake of better understanding and clarity.

7. The correct pitch of the multiscopic optical element is determined, based on an interference pattern represented in the at least one image. In this regard, the at least one processor can analyse the interference pattern to identify different characteristics of the interference pattern, for example, such as a frequency of an interference beat in the interference pattern, an orientation of the interference beat, a spatial distribution of interference beats in the interference pattern, and the like. These different characteristics can provide information pertaining to how much the estimated pitch is to be adjusted to reach closer to the correct pitch. Based on this analysis, the at least one processor can refine the estimated pitch in an iterative manner, generating subsequent multiscopic images and capturing corresponding interference patterns for subsequent iterations. With each iteration, the at least one processor adjusts the estimated pitch to progressively converge towards the correct pitch. This iterative approach ensures that the calibration process is precise and robust, even in cases where an initial value of the estimated pitch is significantly off from the correct pitch. By refining the estimated pitch automatically in this manner, the system and the method facilitate in determining the correct pitch, thereby eliminating visual artifacts and enabling accurate image rendering.

In some implementations, optionally, when determining the correct pitch, the at least one processor is configured to determine a frequency of an interference beat in the interference pattern, wherein the correct pitch is determined based further on the estimated pitch and the frequency of the interference beat in the interference pattern. In this regard, the at least one processor analyses the interference pattern to determine the frequency of the interference beat. Typically, the frequency of the interference beat is inversely related to a wavelength of the interference beat. Optionally, in this regard, the at least one processor is configured to determine a spatial distance between centres of two adjacent interference beats of a same colour in the interference pattern, for determining the wavelength of the interference beat. Optionally, when determining the frequency of the interference beat in the interference pattern, the at least one processor is configured to employ a Fourier Transform-based technique. The term "interference beats" in the interference pattern refers to alternating regions of variable intensity or brightness of the at least one first colour and the at least one second colour. It will be appreciated that when an estimated thickness of the multiscopic optical element is correct, the interference beats in the interference pattern are equidistant from each other. Otherwise, when the estimated thickness is incorrect, a density of interference beats in a central region of the interference pattern is greater than a density of interference beats in a peripheral region of the interference pattern. For determining the correct pitch, it can be assumed that the estimated thickness of the multiscopic optical element is already correct.

A relationship between the correct pitch, the estimated pitch, and the frequency of the interference beat can be expressed mathematically as:

$$1/W = \text{absolute of } (1/C - 1/E),$$

wherein

"W" refers to the wavelength of the interference beat;
"1/W" refers to the frequency of the interference beat;
"C" refers to the correct pitch of the multiscopic optical element; and
"E" refers to the estimated pitch of the multiscopic optical element.

By solving the above equation, the at least one processor can determine the correct pitch. A technical benefit of this implementation is that it allows the at least one processor to refine the correct pitch with high accuracy by leveraging the frequency of the interference beat, even when the initial values of the estimated pitch is significantly off from the correct pitch.

For illustration purposes only, there will now be considered an example wherein a lenticular array comprises lenticular lenses that are designed to have a width of 0.62 millimetres (mm) with an expected manufacturing and thermal variation of ±0.02 mm. This means the correct pitch of the lenticular lenses is expected to lie within a range of 0.60 mm to 0.64 mm under normal operating conditions.

In this example, the estimated pitch of the multiscopic optical element (namely, a lenticular lens) is initially selected as 0.7 mm and the wavelength of the interference beat in an interference pattern produced is assumed to be equal to 5 mm. Using the aforesaid mathematical expression, the correct pitch of the multiscopic optical element can be calculated as:

$1/5$=absolute of $(1/C-1/0.7)$ $C$=0.614 mm or 0.814 mm

However, since the designed width of the lenticular lenses is known to be approximately 0.62 mm+0.02 mm, the first calculated value of 0.614 mm falls within the expected range for the correct pitch, while the second calculated value of 0.814 mm lies outside this expected range. Therefore, the second calculated value of 0.814 mm can be ruled out as a wrong alternative, and the first calculated value of 0.614 mm is thereby identified as the correct pitch of the multiscopic optical element.

As noted hereinabove, while the determination of the correct pitch based on the frequency of the interference beat provides an accurate value, it often results in two possible values for the correct pitch due to the absolute nature of the aforesaid mathematical expression. To resolve this ambiguity and reliably identify the correct pitch out of its two alternative values, the at least one processor can employ some additional steps. Optionally, in this regard, when determining the correct pitch, the at least one processor is configured to rule out a wrong one out of two alternative values of the correct pitch, based on at least one of:

a pre-known approximate value of the correct pitch;

at least one repetition of the step of selecting the estimated pitch, the step of generating the multiscopic image, the step of displaying the multiscopic image, the step of capturing the at least one image and the step of determining the correct pitch, using at least one different value of the estimated pitch.

Using the pre-known approximate value of the correct pitch, the at least one processor can rule out the wrong one out of the two alternative values of the correct pitch (namely, the incorrect alternative). The pre-known approximate value of the correct pitch is typically derived from prior knowledge of the multiscopic optical element's design or manufacturing specifications, including expected tolerances such as those caused by thermal expansion or production variability. The pre-known approximate value serves as a reference to compare with the two alternative values of the correct pitch. Since a value of the correct pitch is highly likely closer to the pre-known approximate value of the correct pitch, the at least one processor can rule out an alternative value of the correct pitch that deviates significantly from the pre-known approximate value of the correct pitch, as compared to another, remaining alternative value of the correct pitch.

This approach has been illustrated above with the help of an example, wherein such ambiguity was resolved by referencing the expected range of the correct pitch. A technical benefit of this approach is that it ensures that the at least one processor selects the correct pitch with high accuracy and reliability by eliminating the incorrect alternative, ensuring that the calibration process consistently converges on a true value of the correct pitch.

Furthermore, in addition to or as an alternative of using the pre-known approximate value of the correct pitch, the at least one processor is optionally configured to select one of the two alternative values of the correct pitch as the at least one different value of the estimated pitch (namely, a new estimated pitch) and repeat the calibration process (by performing the aforesaid processing steps). In other words, the at least one processor generates a new multiscopic image based on the at least one different value of the estimated pitch, captures a corresponding interference pattern, and re-calculates the correct pitch. If the re-calculated value of the correct pitch converges toward the (selected) one of the two alternative values of the correct pitch, it is confirmed that the one of the two alternative values is correct, and another of the two alternative values is ruled out. This iterative process ensures that the system validates the at least one different value of the correct pitch by checking for consistency across multiple iterations. It is noteworthy that when the re-calculated value of the correct pitch diverges (instead of converging) from the one of the two alternative values of the correct pitch, the at least one processor is optionally configured to select the another of the two alternative values of the correct pitch, and repeat the calibration process to confirm its correctness, in a similar manner.

For illustration purposes only, there will now be continued the aforesaid example where two alternative values for the correct pitch are determined as 0.614 mm or 0.814 mm, based on the estimated pitch of 0.7 mm and the determined wavelength of the interference beat of 5 mm. Instead of relying on a pre-known approximate value of the correct pitch for resolving this ambiguity, an additional round of the aforementioned steps can be performed by selecting a next estimated pitch that is intentionally moved closer to one of the two previously calculated alternatives. For example, the next estimated pitch may be chosen as 0.65 mm instead of 0.7 mm, to intentionally shift closer toward the first calculated value of 0.614 mm.

A next multiscopic image is then generated based on the next estimated pitch, and displayed via the multiscopic display, while at least one next image of the display area is captured using the at least one camera. A wavelength of an interference beat in a next interference pattern (represented in the at least one next image) is then determined again. In this scenario:

If 0.614 mm is indeed the correct pitch, moving the estimated pitch from 0.7 mm closer toward 0.614 mm (i.e., to 0.65 mm) will increase the beat wavelength, because the absolute difference between the estimated pitch and the correct pitch decreases.

Conversely, if 0.814 mm were the correct pitch, moving the estimated pitch from 0.7 mm toward 0.65 mm would decrease the beat wavelength, because the estimated pitch would be moving further away from the correct pitch.

By observing how the wavelength of the interference beat changes between these iterations, a correct one of the two alternative values corresponding to the correct pitch can be identified. Only one of the two alternative values will exhibit behaviour that is consistent with the observed changes in the interference pattern across the different values of the estimated pitch. This iterative approach enables reliable resolution of the ambiguity between the two alternative values corresponding to the correct pitch, without relying on prior knowledge of the lens design parameters.

A technical benefit of this implementation is that it resolves the ambiguity between the two alternative values of the correct pitch with high accuracy and reliability. By leveraging the pre-known approximate value and/or an iterative refinement process using the at least one different value of the estimated pitch, the system eliminates a risk of selecting an incorrect pitch, which could lead to visual artifacts and suboptimal image rendering. This approach enhances the precision and robustness of the calibration process.

It will be appreciated that in order to ensure that the at least one image accurately represents the display area and can be effectively analysed for calibration purposes, the at least one processor can perform some additional processing steps which address potential distortions and misalignments in the at least one image, enabling precise analysis of the interference pattern. Optionally, in this regard, the at least one processor is configured to:

rectify the at least one image by undistorting and cropping, to represent the display area only; and analyse the interference pattern, based on a mapping between pixels of the first image with pixels of the at least one image, post rectifying.

Performing the step of rectifying the at least one image by undistorting and cropping ensures that the at least one image is corrected for any distortions or extraneous elements that may affect the accuracy of the calibration process. By undistorting the at least one image, the at least one processor corrects geometric distortions (for example, such as a pincushion distortion, a barrel distortion, or other similar distortions) in the at least one image. This is necessary to perform because the distortions can cause inaccuracies in visual representation of the display area in the at least one image, resulting into errors in the analysis of the interference pattern. By undistorting the at least one image, the at least one processor ensures that the at least one image accurately represents a geometry of the display area and thus the interference pattern also. It will be appreciated that undistorting the at least one image compensates for distortions in an optical path from the multiscopic display towards the at least one camera, due to at least one of: an optical combiner, a semi-reflective mirror, a curvature of the display area, a curvature of the optical combiner. Furthermore, the at least one processor can perform cropping to isolate the display area in the at least one image, removing any extraneous elements outside the display area. This ensures that visual information of only relevant portion of the at least one image (i.e., the display area) is available for analysis, improving the efficiency and accuracy of the calibration process. The step of rectifying the at least one image by undistorting and cropping can be performed using any suitable well-known technique. An exemplary rectified image has been illustrated in conjunction with FIG. 3B, for sake of better understanding and clarity. It will be appreciated that well-known computer vision (CV) methods can also be employed to detect an outline of the display area in the at least one image. Based on the detected outline, an approximate rectification of the at least one image can be performed. Further optionally, ARUCO or similar markers can be placed near the display area, and then the at least one image can be captured. The at least one processor can analyse the locations of the ARUCO or similar markers to deduce an outline of the display area in the at least one image, and can perform approximate rectification of the at least one image.

Performing the step of analysing the interference pattern, based on the aforesaid mapping ensures that the interference pattern is analysed in a correct spatial context. This means that the at least one processor analyses the interference pattern as if the first viewer is directly seeing the first image. This is critical because the optical location of the at least one camera is considered as the location of the first viewer, and the first image is intended to be presented to the first viewer (i.e., what the first viewer should ideally see but actually sees the at least one image captured by the at least one camera). In other words, when the at least one image is captured, it does not perfectly match the first image (which is intended to be presented to the first viewer). This mismatch occurs because the multiscopic image is generated using the estimated pitch, which is not the correct pitch, and as a result, the at least one image represents the interference pattern. The aforesaid mapping is done to align pixels of the first image with corresponding pixels of the at least one image, effectively compensating for the mismatch. This alignment allows the at least one processor to analyse the interference pattern in a correct spatial relationship between the first image and the at least one image, enabling it to accurately determine the calibration parameters, for example, such as the correct pitch of the multiscopic optical element, with high accuracy and reliability.

To further enhance the accuracy of the rectification process, the system may account for additional factors that may arise due to elements in the optical path. One such element is an optical combiner, which can introduce specific effects that need to be addressed during rectification of the at least one image. Optionally, in this regard, the system further comprises an optical combiner arranged on an optical path of the multiscopic display, and wherein when rectifying, the at least one processor is configured to rectify the at least one image by also mirroring the at least one image, based on an optical path from the multiscopic display towards the at least one camera via the optical combiner.

A technical benefit of performing the mirroring lies in ensuring that the at least one image accurately represents the display area when the optical combiner is arranged on the optical path. When the optical combiner is arranged on the optical path, light emitted from the display area of the multiscopic display reflect off the optical combiner towards the at least one camera. In such a case, the at least one image captured by the at least one camera is inverted or flipped due to optical properties of a semi-reflective surface of the optical combiner that typically changes the image orientation when the light is reflected off it. Due to this, the at least one image no longer corresponds to an actual spatial orientation of the display area. This misrepresentation can lead to difficulties and errors in analysing the interference pattern and determining the calibration parameters. By mirroring the at least one image during rectification, the at least one processor corrects the inversion of the at least one image, ensuring that it is properly oriented and accurately represents the display area (and the interference pattern). This maintains the accuracy and reliability of the calibration process. The step of mirroring the at least one image can be performed using any suitable well-known image processing technique.

Furthermore, in some implementations, optionally, the at least one processor is configured to:

select an estimated phase of the multiscopic optical element relative to a pixel array of the multiscopic display, wherein the multiscopic image is generated based further on the estimated phase;

select a given interference beat that is closest to an origin of the at least one image;

determine a distance between the origin of the at least one image and a centre of a first part of the given interference beat having the at least one first colour; and determine a correct phase of the multiscopic optical element relative to the pixel array of the multiscopic display, based on the estimated phase and said distance.

The term "phase" of the multiscopic optical element refers to a lateral alignment (namely, a lateral shift or offset)

between the multiscopic optical element and the (underlying) pixel array of the multiscopic display. Typically, the phase of the multiscopic optical element is measured as a fraction of the pitch of the multiscopic optical element relative to the pixel array. It will be appreciated that the estimated phase is a closest possible guess for the correct phase, and the interference pattern is generated whenever the estimated pitch is incorrect, irrespective of the estimated phase. The phase indicates relative positions of crests and valleys of the interference pattern within the at least one image. Determination of the correct phase involves adjusting values of the estimated phase in a manner that a crest of the interference pattern is aligned with the origin of the at least one image. The step of selecting the estimated phase is performed prior to performing the step of capturing the at least one image and the step of displaying the multiscopic image. In an example, for a lenticular array in which a lenticular lens is designed to have a width of 0.62 mm, a pitch of the multiscopic optical element (namely, the lenticular lens) can be selected as 0.62 mm. In such a case, the estimated phase may be selected as 0.1 times the pitch (i.e., equal to 0.062 mm), representing a small lateral offset.

Typically, the origin of the at least one image lies at a centre of the display area. It will be appreciated that upon rectification, when the at least one image represents the display area only (and no extraneous elements), an optical centre of the at least one image coincides with the centre of the display area. It will also be appreciated that defining the origin at the centre of the display area simplifies the calibration process. When the estimated pitch is adjusted, the interference pattern "zooms in" or "zooms out," but the origin of the at least one image remains stationary. This makes it easier to determine the distance between the origin of the at least one image and the centre of the first part of the given interference beat (namely, a phase shift), required for aligning the multiscopic optical element with respect to the pixel array. When the origin of the at least one image is at the centre of the display area, the at least one processor identifies the given interference beat as the one that is closest to the centre of the display area, for example, such as a central, black-coloured interference beat amongst all black-coloured and white-coloured interference beats in the interference pattern. In some cases, the origin of the at least one image may be defined elsewhere, away from the centre of the display area. Optionally, when selecting the given interference beat, the at least one processor is configured to analyse a central portion of the interference pattern.

The distance between the origin and the centre represents the lateral misalignment between the multiscopic optical element and the pixel array. Said distance is critical for calculating the phase shift required to align the multiscopic optical element with respect to the pixel array. By determining how far the given interference beat is from the origin, the at least one processor can quantify the lateral misalignment. It will be appreciated that for a lenticular array, the phase defines a relative position of the lenticular array with respect to the centre of the display area, expressed in a normalised range of 0 to 1. A phase value of 0.5 corresponds to a center of a lenticular lens of the lenticular array, while a phase value of 0 or 1 corresponds to a boundary between two lenticular lenses of the lenticular array. When the interference pattern is generated, adjusting values of the estimated phase would shift the interference pattern laterally across the display area. Thus, a full phase cycle (from 0 to 1) corresponds to moving the interference pattern by exactly one interference beat, meaning the interference pattern appears identical after completing the full phase cycle. Therefore, adjustment to the values of the estimated phase can be performed in terms of sizes relative to interference beats in a currently-detected interference pattern. Optionally, when determining the distance between the origin and the centre, the at least one processor is configured to employ at least one of: a Fourier Transform-based technique, a gradient-based shift detection technique. The aforesaid techniques are well-known in the art. It will be appreciated that at least a central portion of the first image may determine light intensities of interference beats lying at the central portion of the interference pattern. In such a case, the at least one first colour of the centre of the first part of the given interference beat is likely same as a colour in at least the central portion of the first image.

The at least one processor calculates the correct phase to align the given interference beat with the origin of the at least one image. This involves adjusting a lateral position of the multiscopic optical element or digitally re-mapping rendered views to compensate for the lateral misalignment. A technical benefit of determining the correct phase in this manner ensures that the multiscopic optical element is well-aligned with the pixel array, eliminating phase-related visual artifacts in images, thereby improving an overall viewing experience of a viewer.

Moreover, optionally, the at least one processor is configured to:
 select an estimated orientation of the multiscopic optical element relative to a pixel array of the multiscopic display, wherein the multiscopic image is generated based further on the estimated orientation;
 determine a beat orientation in the interference pattern; and
 determine a correct orientation of the multiscopic optical element relative to the pixel array of the multiscopic display, based on the estimated orientation and the beat orientation.

The term "orientation" of the multiscopic optical element refers to a rotational alignment of the multiscopic optical element with respect to the pixel array. In other words, the orientation is a rotation of a longitudinal axis (i.e., a Y-axis) of the multiscopic optical element with respect to a longitudinal axis (i.e., a Y-axis) of the pixel array, specifically, about a Z-axis (namely, a depth axis) of the multiscopic display. It will be appreciated that in a typical implementation, the longitudinal axis of the multiscopic optical element is slightly aligned (for example, such as by 6 degrees) with respect to the longitudinal axis of the pixel array, for minimising visual artifacts (for example, such as aliasing effects or colour fringing).

It will be appreciated that the estimated orientation is a closest possible guess for the correct orientation, and the interference pattern is generated whenever the estimated pitch is incorrect, irrespective of the estimated orientation. It is to be noted that when the estimated phase is incorrect, the interference pattern is generated with interference beats aligned at specific orientations. The step of selecting the estimated orientation is performed prior to performing the step of capturing the at least one image and the step of displaying the multiscopic image. It will also be appreciated that the correct pitch and the correct phase can be determined from a single interference pattern image, but determination of the correct orientation requires analysing at least two captured images of the display areas with at least two different calibration settings. However, when the interference pattern is already correctly aligned, i.e., when the interference beats in the interference pattern do not have any orientations, it indicates that the orientation is already correct, and the calibration of the orientation is not required.

The term "beat orientation" refers to an angle at which a given interference beat in the interference pattern is aligned with respect to a longitudinal axis (i.e., a Y-axis) of the display area. It will be appreciated that when the multiscopic optical element is aligned at an incorrect angle with respect to the pixel array, interference beats in the interference pattern will appear rotated at a certain angle, and the at least one processor calculates the certain angle as the beat orientation. On the other hand, when the multiscopic optical element is aligned at a correct angle (namely, the correct orientation) with respect to the pixel array, interference beats in the interference pattern do not have any angular skew (i.e., the interference beats will be straight and aligned with the pixel array). The step of determining the beat orientation in the interference pattern can be performed using any suitable well-known technique.

Once the estimated orientation and the beat orientation are known, the at least one processor iteratively adjusts a value of the estimated orientation and generates subsequent multiscopic images, in order to reach the correct orientation, i.e., until the multiscopic optical element is accurately aligned. For each adjustment in the value of the estimated orientation, a corresponding interference pattern is captured and the beat orientation is measured. The at least one processor continues performing these steps until the beat orientation indicates a proper alignment (i.e., until the interference beats in the interference pattern are not angularly skewed). A technical benefit of this implementation is that provides a precise and accurate way for determining the correct orientation of the multiscopic optical element. This ensures that the multiscopic optical element is correctly rotationally aligned with the pixel array. Due to this, orientation-related visual artifacts, such as generation of skewed or distorted images, are eliminated, and it is ensured that the multiscopic display is susceptible to produce high-quality, accurate images.

It is noteworthy that determining a correct direction for iteratively adjusting values of the estimated orientation to reach the correct orientation is significantly important. When the multiscopic optical element is inaccurately aligned with respect to the pixel array, the estimated orientation is to be rotated (in a step-by-step manner by a given value) either in a clockwise direction or in a counter-clockwise direction, to achieve a proper alignment of the multiscopic optical element with the pixel array. However, there are two possible directions for iteratively adjusting the values of the estimated orientation, and choosing a wrong direction for rotating the estimated orientation can increase a misalignment between the multiscopic optical element and the pixel array, making the calibration process inefficient or inaccurate. To ensure that iterations for the estimated orientation converge toward the correct orientation, it is critical to rule out the wrong direction early in the calibration process. By ruling out the wrong direction, the system ensures that the iterative process is efficient, accurate, and converges toward the correct orientation of the multiscopic optical element.

Optionally, in this regard, when determining the correct orientation, the at least one processor is configured to rule out a wrong one out of two alternative directions in which the estimated orientation is to be rotated to reach the correct orientation, by:
repeating the step of selecting the estimated orientation, the step of generating the multiscopic image, the step of displaying the multiscopic image, the step of capturing the at least one image and the step of determining the beat orientation, using different values of the estimated orientation;
detecting a change in the beat orientation; and
adjusting the different values of the estimated orientation in a direction that is opposite to a direction of the change in the beat orientation.

By iteratively selecting the different values of the estimated orientation and detecting changes in the beat orientation during these iterations, the at least one processor identifies whether or not the estimated orientation is being adjusted in a correct direction (i.e., a clockwise direction or a counter-clockwise direction), thereby ruling out a wrong direction in the calibration process. This is done by analysing how the beat orientation in the interference pattern changes during the iterations, indicating whether the rotations of the estimated orientation are moving closer to or further from the correct orientation. In a case where with each iteration, the interference pattern becomes more misaligned, with the beat orientation turning further sideways (i.e., away from being closer to 0 degree), it indicates that a direction (i.e., one of the two alternative directions) in which the estimated orientation is being rotated is incorrect. In another case where with each iteration, the interference pattern becomes less misaligned, with the beat orientation moving closer to 0 degree, it indicates that a direction (i.e., another of the two alternative directions) in which the estimated orientation is being rotated is correct. A technical benefit of this implementation is that it enhances the precision of the calibration process by using the aforesaid directional correction logic to rule out the wrong one out of the two alternative directions. Iterating with the different values of the estimated orientation ensures high accuracy, as the at least one processor can refine the orientation of the multiscopic optical element in a step-by-step manner, even when an initial value of the estimated orientation is significantly off. This approach minimises errors and ensures that the multiscopic optical element is accurately rotationally aligned with the pixel array.

For illustration purposes only, there will now be considered an example where a value of the estimated orientation is initially selected as 0 degree. In such a case, a value of the beat orientation is determined as 4 degrees, indicating that the multiscopic optical element is not accurately aligned with respect to the pixel array. There will now be considered following different cases:

Case 1: When the different values of the estimated orientation are used in a sequence: 3 degrees, 4 degrees, 5 degrees, 6 degrees, in a clockwise direction (from the initial 0 degree), the beat orientation is changed (i.e., reduced from the 4 degrees) in a sequence: 2.5 degrees, 2 degrees, 1 degree, 0 degree, respectively. This indicates that a direction (namely, the clockwise direction) in which the estimated orientation is rotated, is correct, and that the multiscopic optical element is now accurately aligned with respect to the pixel array. This case has been also illustrated in conjunction with FIG. 4, for sake of better understanding and clarity.

Case 2: When the different values of the estimated orientation are used in a sequence: 3 degrees, 4 degrees, 5 degrees, 6 degrees, in a counter-clockwise direction (from the initial 0 degree), the beat orientation is changed (i.e., increased from the 4 degrees) in a sequence: 4.5 degrees, 5 degrees, 5.5 degrees, 6 degrees, respectively. This indicates that a direction (namely, the counter-clockwise direction) in which the estimated orientation is rotated, is incorrect, and thus values of the estimated orientation should be adjusted in an opposite direction i.e., a clockwise direction.

Furthermore, optionally, the at least one processor is configured to:
- detect when an accuracy of the estimated pitch with respect to the correct pitch is less than an accuracy of the estimated orientation with respect to the correct orientation; and
- when the accuracy of the estimated pitch is less than the accuracy of the estimated orientation,
  - repeat the step of selecting the estimated pitch, the step of selecting the estimated orientation, the step of generating the multiscopic image, the step of displaying the multiscopic image, the step of capturing the at least one image, and the step of determining the beat orientation, using different values of the estimated pitch and a same value of the estimated orientation;
  - detect another change in the beat orientation; and
  - adjust the different values of the estimated pitch in a direction that is opposite to a direction of the another change in the beat orientation.

Refinement in the value of the estimated pitch (to reach the correct pitch) is performed in the aforesaid iterative manner only when the accuracy of the estimated pitch is less than the accuracy of the estimated orientation. This is because the pitch and the orientation of the multiscopic optical element are interdependent. The interference pattern is influenced by both the pitch and the orientation of the multiscopic optical element. If the estimated orientation is accurate with respect to the correct orientation, any remaining misalignment in the interference pattern may primarily be due to inaccuracies in the estimated pitch, which is inaccurate with respect to the correct pitch. Therefore, focusing on refining the estimated pitch whilst keeping the estimated orientation unchanged ensures that the calibration process targets a primary source of error. Additionally, by keeping the estimated orientation unchanged, the at least one processor focuses solely on resolving pitch-related misalignments without introducing additional variables, making it easier to identify the correct pitch. This approach ensures that the calibration process is efficient and avoids redundant adjustments. It will be appreciated that the accuracy of the estimated pitch can be inferred, for example, by analysing a degree of closeness between the estimated pitch and the pre-known approximate value of the correct pitch. Similarly, the accuracy of the estimated orientation can be inferred, for example, by analysing how much a corresponding beat orientation approaches 0 degree. These inferences are based on an iterative nature of the calibration process, where adjustments to the estimated pitch and the estimated orientation are made to minimise errors in misalignment and achieve convergence toward respective correct values.

A purpose of using the different values of the estimated pitch is to iteratively adjust and analyse the interference pattern to converge toward the correct pitch. Using the different values of the estimated pitch allows the at least one processor to ascertain how the interference pattern changes, depending on whether a current value of the estimated pitch is less than or greater than a value of the correct pitch. When the current value of the estimated pitch is less than the value of the correct pitch, the interference pattern turns in one direction (i.e., the beat orientation rotates in one of the clockwise direction and the counter-clockwise direction). On the other hand, when the current value of the estimated pitch is greater than the value of the correct pitch, the interference pattern turns in an opposite direction (i.e., the beat orientation rotates another of the clockwise direction and the counter-clockwise direction). By analysing such changes in the interference pattern, the at least one processor can iteratively adjust the values of the estimated pitch to converge toward the correct pitch. This directional behaviour of the interference pattern provides critical feedback to the at least one processor for refining the estimated pitch with high accuracy. This approach potentially ensures that the multiscopic optical element is aligned with the pixel array in terms of both the pitch and the orientation, resulting in high-quality image rendering, upon calibration.

For illustration purposes only, there will now be considered an example where for a lenticular lens of a lenticular array, a value of the estimated orientation is used as 5 degrees, and a value of the estimated pitch is initially selected as 0.62 mm. In such a case, the beat orientation may be determined as 3 degrees. There will now be considered the following different cases:

Case 1: When the different values of the estimated pitch are used in a sequence: 0.63 mm, 0.64 mm, 0.65 mm, 0.66 mm (while keeping the estimated orientation unchanged at 5 degrees), the beat orientation is changed (i.e., reduced from the initial 3 degrees) in a sequence: 2.5 degrees, 1.5 degrees, 0.5 degree, 0 degree, respectively. This indicates that the values of the estimated pitch are converging toward the correct pitch (for example, equal to 0.69 mm), and the multiscopic optical element is now accurately aligned with respect to the pixel array in terms of both the pitch and the orientation.

Case 2: When the different values of the estimated pitch are used in a sequence: 0.61 mm, 0.60 mm, 0.59 mm, 0.58 mm (while keeping the estimated orientation unchanged at 5 degrees), the beat orientation is changed (i.e., increased from the initial 3 degrees) in a sequence: 5 degrees, 6 degrees, 7.5 degrees, 8 degrees, respectively. This indicates that the values of the estimated pitch are diverging from the correct pitch, and thus the values of the estimated pitch should be adjusted in the opposite direction (i.e., increased instead of decreased).

Optionally, the at least one processor is configured to:
- select an estimated thickness of the multiscopic optical element in the multiscopic display, wherein the multiscopic image is generated based further on the estimated thickness;
- determine a difference between a first frequency of interference beats located towards an edge of the display area and a second frequency of interference beats located at a centre of the display area; and
- determine a correct thickness of the multiscopic optical element, based on the estimated thickness and the difference between the first frequency and the second frequency.

The term "thickness" of the multiscopic optical element refers to a physical thickness of the multiscopic optical element. It will be appreciated that the estimated thickness is a closest possible guess for the correct thickness, and the interference pattern is generated whenever the estimated pitch is incorrect, irrespective of the estimated thickness. It is to be noted that when the estimated thickness is incorrect, the interference pattern is generated with interference beats being spatially variably distributed in the interference pattern. The step of selecting the estimated thickness is performed prior to performing the step of capturing the at least one image and the step of displaying the multiscopic image. It will also be appreciated that when the multiscopic image is generated based further on the estimated thickness, the at least one processor also takes into account an optical thickness of the multiscopic optical element which depends on a refractive index of a material of the multiscopic optical element. This is because the optical thickness can alter how light bends and affects an autostereoscopic effect for which the multiscopic optical element is employed.

When the estimated thickness of the multiscopic optical element is incorrect, there would an amount of change in the interference pattern, namely, the difference between the first frequency and the second frequency. In other words, when the estimated thickness is incorrect, an optical path length for light rays passing through it varies non-uniformly across the display area. At the centre of the display, the light rays pass through the multiscopic optical element at a more perpendicular angle, resulting in a shorter and more consistent optical path. This leads to a higher density of the interference beats located at the centre, and thus a second wavelength (i.e., reciprocal of the second frequency) of these interference beats is shorter. On the other hand, towards the edge of the display area, the light rays pass through the multiscopic optical element at more oblique angles, causing greater variation in the optical path length. This results in a lower density of the interference beats located towards the edge. Additionally, the thickness of the multiscopic optical element directly affects how the light is refracted or blocked as it passes through. When the estimated thickness is incorrect, effective optical properties (such as a focal length, a refractive index, and the like) of the multiscopic optical element deviate from their intended values. This deviation causes the interference beats to "spread out" or "compress" unevenly across the display area, leading to a difference in frequencies of interference beats between the centre and the edge of the display area. This has been also illustrated in conjunction with FIG. 5, for sake of better understanding and clarity.

The at least one processor determines the correct thickness of the multiscopic optical element by iteratively adjusting the value of the estimated thickness and analysing resulting interference patterns after each adjustment in the value of the estimated thickness. The correct thickness is reached or converged upon when the difference between the first frequency and the second frequency tends to zero (or near-zero) or when a frequency of the interference beats becomes uniform across the display area. This uniformity indicates that the interference beats are equidistant throughout the display area, signifying that the multiscopic optical element is now correctly calibrated in terms of its thickness. A technical benefit of this implementation it eliminates thickness-related distortions/artifacts, enhances visual quality of images displayed via the multiscopic display, and ensures reliable calibration for optimal performance of the multiscopic display.

For illustration purposes only, there will now be considered an example where an initial value of the estimated thickness of the multiscopic optical element is selected as 1.8 mm. In such a case, the at least one processor determines that the first frequency of the interference beats is 5 beats per unit distance, while the second frequency of the interference beats is 8 beats per unit distance. This indicates that the estimated thickness is incorrect, as the difference between the first frequency and the second frequency is non-uniform. The processor then iteratively adjusts the estimated thickness as follows:

Iteration 1: The value of the estimated thickness is selected as 1.9 mm. The first frequency becomes 6 beats per unit distance, the second frequency becomes 7 beats per unit distance, and the difference therebetween is reduced, but still it is non-uniform. Thus, a subsequent iteration is performed.

Iteration 2: The value of the estimated thickness is selected as 2 mm. The first frequency and the second frequency both become 4 beats per unit distance, indicating that the interference beats are now equidistant across the display area. At this point, the at least one processor determines that the correct thickness of the multiscopic optical element is 2 mm, as the difference between the first frequency and the second frequency has converged to zero or near-zero.

It is noteworthy that a correction of the estimated pitch will be performed as a final step in the calibration process. This is because corrections for the estimated orientation, the estimated thickness, and the estimated phase of the multiscopic optical element are dependent on a presence of the interference pattern in the at least one image. The interference pattern is generated only when the estimated is intentionally incorrect. If the estimated pitch is already correct, no interference pattern will be captured in the at least one image. Instead, the at least one image would represent the at least one first colour of the first image that is intended to be presented to the first viewer (namely, the at least one camera). Therefore, to ensure the presence of the interference pattern required for determining and correcting the estimated orientation, the estimated thickness, and the estimated phase, the estimated pitch is deliberately chosen to be incorrect during these steps. Once these corrections are completed, a value of the estimated pitch correction is refined to reach the correct pitch.

Optionally, the at least one processor is configured to:
determine a plurality of angular interpupillary distances for a plurality of viewing distances; and
select the given angular interpupillary distance from amongst the plurality of angular interpupillary distances.

A technical benefit of this is that it ensures the multiscopic display is calibrated for viewers at different viewing distances, accounting for changes in the angular interpupillary distance. By performing the calibration process iteratively for the different viewing distances, the system and the method achieve high accuracy and reliability across a wide range of viewers locations. This enhances the flexibility and usability of the multiscopic display, ensuring accurate performance and visual quality for all viewers, regardless of their distance from the display area.

As mentioned earlier, the angular interpupillary distance changes with the change in the viewing distance. The at least one processor performs the calibration process (for example, determining calibration parameters such as the correct pitch, the correct phase, the correct orientation, and/or the correct thickness) corresponding to a given viewing distance, which is measured along the optical path of the multiscopic display. This accounts for the angular interpupillary distance of the user at the given viewing distance, which directly affects generation of the interference pattern and determination of the calibration parameters.

For illustration purposes only, there will now be described how various components of the system can be implemented. The at least one processor controls an overall operation of the system. The at least one processor is communicably coupled to the multiscopic display and the at least one camera. Optionally, the at least one processor is implemented as a processor of the multiscopic display. Alternatively, optionally, the at least one processor is implemented as a processor of a computing device that is communicably coupled to the multiscopic display. Examples of the computing device include, but are not limited to, a laptop, a desktop, a tablet, a phablet, a personal digital assistant, a workstation, and a console. Yet alternatively, optionally, the at least one processor is implemented as a cloud server (namely, a remote server) that provides a cloud computing service.

It will be appreciated that the system and the method can be implemented, for example, in a vehicle. The vehicle could, for example, be a car, a truck, an aircraft, a speed boat or the like. Optionally, in this regard, the multiscopic display is arranged on a dashboard of the vehicle, and the optical combiner is implemented using a transparent portion of a windshield of the vehicle. It will be appreciated that there may be some cases where the multiscopic display may be arranged on a roof of the vehicle, but not on the dashboard of the vehicle. Similarly, the optical combiner may be implemented using a pull-down reflector or similar, but not using the windshield of the vehicle. In an example, when the system is implemented in the aircraft, the multiscopic display may be roof-mounted, and may be employed to display locations of other aircrafts that are in a vicinity of said aircraft.

Optionally, the at least one camera is implemented as at least one tracking camera of a tracker employed to detect and/or track at least a position of a given eye of a given user. The at least one tracking camera may comprise at least one of: at least one visible-light camera, at least one infrared (IR) camera, at least one depth camera. Examples of such a visible-light camera include, but are not limited to, a Red-Green-Blue (RGB) camera, a Red-Green-Blue-Alpha (RGB-A) camera, a Red-Green-Blue-Depth (RGB-D) camera, a Red-Green-Blue-White (RGBW) camera, a Red-Yellow-Yellow-Blue (RYYB) camera, a Red-Green-Green-Blue (RGGB) camera, a Red-Clear-Clear-Blue (RCCB) camera, a Red-Green-Blue-Infrared (RGB-IR) camera, and a monochrome camera. Examples of such a depth camera include, but are not limited to, a ToF camera, a LiDAR camera, an RGB-D camera, a laser rangefinder, a stereo camera, a plenoptic camera, a ranging camera, a SONAR camera. Alternatively, optionally, the at least one camera is implemented as a separate, individual camera instead of the at least one tracking camera of the tracker.

In some implementations, the multiscopic display can be implemented as a light field display unit. Pursuant to embodiments of the present disclosure, different types of light field display units can be implemented. For example, the light field display unit can be any one of: a hogel-based light field display unit, a lenticular array-based light field display unit, a parallax barrier-based light field display unit. The light field display unit could be implemented as a display with or without a backlight. Examples of the display include, but are not limited to, a Liquid Crystal Display (LCD), a Light-Emitting Diode (LED)-based display, a micro LED-based display, an Organic LED (OLED)-based display, a micro OLED-based display, an Active Matrix OLED (AMOLED)-based display, and a Liquid Crystal on Silicon (LCoS)-based display. When the multiscopic display is implemented as a light field display unit, the multiscopic image is generated as a light field image.

Throughout the present disclosure, the term "multiscopic optical element" of the multiscopic display refers to a specialised optical element that is capable of directing light rays incident thereupon in different directions simultaneously. This allows the multiscopic optical element to present a multiscopic view to a user without any need for her/him to wear 3D glasses. Optionally, the multiscopic optical element is implemented as any one of: a parallax barrier, a lenticular array. The multiscopic optical element can be static or actively controllable. The multiscopic optical element and its forms are well-known in the art. It will be appreciated that an alternative to the aforementioned conventional multiscopic optical element, the multiscopic display may comprise a specialised backlight unit comprising a first layer of lenticulars, a diffuser layer, and a second layer of lenticulars. The first layer of lenticulars focuses light emitted by an addressable light-emitting diode (LED) matrix, concentrating the light into near-singular light points on a subsequent diffuser layer. The diffuser layer is arranged to receive the focussed light from the first layer of lenticulars, and serves as an emission surface for light points. The second layer of lenticulars directs the light emitted by the diffuser layer toward specific directions. A steering of the light's direction is achieved by selectively activating specific LEDs within the addressable LED matrix. By leveraging such a configuration, the specialised backlight unit produces steerable collimated light, which is then passed through a traditional LCD panel. The LCD panel is capable of generating a full-resolution colour image, while stereoscopy or multiscopy is realised via temporal multiplexing. The temporal multiplexing allows alternating image frames to be directed toward different eyes (for example, one image frame towards a left eye and a next image frame towards a right eye) of the user, thus enabling depth perception without relying on the conventional multiscopic optical elements. Such a specialised backlight unit is described, for example, in "*Modeling and optimizing through plenoptic function for the dual lenticular lens-based directional autostereoscopic display system*" by Xueling Li, Shengzhi Qiang, Yuanqing Wang, and Xicai Li, published in Optics Express, Vol. 32, Issue 7, pp. 10925-10940, 2024, which has been incorporated herein by reference.

Throughout the present disclosure, the term "optical combiner" refers to a specialised equipment that is capable of reflecting light rays from the display area of the multiscopic display towards a given viewer, when the optical combiner is arranged on the optical path of the multiscopic display. Optionally, the optical combiner is implemented by way of at least one of: a lens, a mirror, a semi-transparent mirror, a semi-transparent film, a semi-transparent flexible membrane, a prism, a beam splitter, an optical waveguide, a polarizer. Optical combiners are well-known in the art. Optionally, a tilt angle of the optical combiner with respect to an image plane of the multiscopic display lies in a range of 10 degrees to 75 degrees.

The present disclosure also relates to the method as described above. Various embodiments and variants disclosed above, with respect to the aforementioned first aspect, apply mutatis mutandis to the method.

Optionally, in the method, the step of determining the correct pitch comprises determining a frequency of an interference beat in the interference pattern, wherein the correct pitch is determined based further on the estimated pitch and the frequency of the interference beat in the interference pattern.

Additionally, optionally, in the method, the step of determining the correct pitch comprises ruling out a wrong one out of two alternative values of the correct pitch, based on at least one of:
  a pre-known approximate value of the correct pitch;
  at least one repetition of the step of selecting the estimated pitch, the step of generating the multiscopic image, the step of displaying the multiscopic image, the step of capturing the at least one image and the step of determining the correct pitch, using at least one different value of the estimated pitch.

Optionally, the method further comprises:
rectifying the at least one image by undistorting and cropping, to represent the display area only; and
analysing the interference pattern, based on a mapping between pixels of the first image with pixels of the at least one image, post rectifying.

Optionally, in the method, the step of rectifying comprises rectifying the at least one image by also mirroring the at least one image, based on an optical path from the multiscopic display towards the at least one camera via an optical combiner, the optical combiner being arranged on an optical path of the multiscopic display.

Optionally, the method further comprises:
selecting an estimated phase of the multiscopic optical element relative to a pixel array of the multiscopic display, wherein the multiscopic image is generated based further on the estimated phase;
selecting a given interference beat that is closest to an origin of the at least one image;
determining a distance between the origin of the at least one image and a centre of a first part of the given interference beat having the at least one first colour; and
determining a correct phase of the multiscopic optical element relative to the pixel array of the multiscopic display, based on the estimated phase and said distance.

Optionally, the method further comprises:
selecting an estimated orientation of the multiscopic optical element relative to a pixel array of the multiscopic display, wherein the multiscopic image is generated based further on the estimated orientation;
determining a beat orientation in the interference pattern; and
determining a correct orientation of the multiscopic optical element relative to the pixel array of the multiscopic display, based on the estimated orientation and the beat orientation.

Optionally, in the method, the step of determining the correct orientation comprising ruling out a wrong one out of two alternative directions in which the estimated orientation is to be rotated to reach the correct orientation, by:
repeating the step of selecting the estimated orientation, the step of generating the multiscopic image, the step of displaying the multiscopic image, the step of capturing the at least one image and the step of determining the beat orientation, using different values of the estimated orientation;
detecting a change in the beat orientation; and
adjusting the different values of the estimated orientation in a direction that is opposite to a direction of the change in the beat orientation.

Additionally, optionally, the method further comprises:
detecting when an accuracy of the estimated pitch with respect to the correct pitch is less than an accuracy of the estimated orientation with respect to the correct orientation; and
when the accuracy of the estimated pitch is less than the accuracy of the estimated orientation,
repeating the step of selecting the estimated pitch, the step of selecting the estimated orientation, the step of generating the multiscopic image, the step of displaying the multiscopic image, the step of capturing the at least one image, and the step of determining the beat orientation, using different values of the estimated pitch and a same value of the estimated orientation;
detecting another change in the beat orientation; and
adjusting the different values of the estimated pitch in a direction that is opposite to a direction of the another change in the beat orientation.

Optionally, the method further comprises:
selecting an estimated thickness of the multiscopic optical element in the multiscopic display, wherein the multiscopic image is generated based further on the estimated thickness;
determining a difference between a first frequency of interference beats located towards an edge of the display area and a second frequency of interference beats located at a centre of the display area; and
determining a correct thickness of the multiscopic optical element, based on the estimated thickness and the difference between the first frequency and the second frequency.

Optionally, the method further comprises:
determining a plurality of angular interpupillary distances for a plurality of viewing distances; and
selecting the given angular interpupillary distance from amongst the plurality of angular interpupillary distances.

Optionally, in the method, the at least one first colour is one of a white colour and a black colour, and the at least one second colour is another of the white colour and the black colour.

Alternatively, optionally, in the method, the at least one second colour includes two or more second colours, wherein a central portion of the second image has one of the two or more second colours, while a remaining portion of the second image has a remainder of the two or more second colours.

Optionally, in the method, the at least one first colour includes two or more first colours, wherein a central portion of the first image has one of the two or more first colours, while a remaining portion of the first image has a remainder of the two or more first colours.

DETAILED DESCRIPTION OF THE DRAWINGS

Referring to FIG. 1, illustrated is a simplified example implementation of a system 100 for automated calibration of a multiscopic display 102, in accordance with an embodiment of the present disclosure. The system 100 is shown to be implemented, for example, in a vehicle 104. The vehicle 104 could, for example, be a car, a truck, an aircraft, a speed boat or the like. The system 100 comprises the multiscopic display 102, at least one camera (for example, depicted as a camera 106), and at least one processor (for example, depicted as a processor 108). The camera 106 is shown to be positioned in a manner that a display area 110 of the multiscopic display 102 lies within a field of view of the camera 106 at least partially. A user 112 is shown to be seated on a seat 114 of the vehicle 104. Optionally, the system 100 further comprises an optical combiner 116 arranged on an optical path of the multiscopic display 102. Optionally, in this regard, the optical combiner 116 is integrated into a windshield (not shown) of the vehicle 104. It is to be noted that FIG. 1 shows a side view of the vehicle 104, for sake of simplicity only. Due to this, the display area 110 of the multiscopic display 102 and the optical combiner 116 are shown from a side. In reality, from a perspective of a pose of the camera 106, the display area 110 and the optical combiner 116 will appear as two-dimensional surfaces only. The processor 108 is configured to perform various operations, as described earlier with respect to the aforementioned first aspect.

It may be understood by a person skilled in the art that FIG. 1 includes a simplified example implementation of the system 100, for sake of clarity, which should not unduly limit the scope of the claims herein. It is to be understood that the specific implementation of the system 100 is provided as an example and is not to be construed as limiting it to specific numbers or types of multiscopic displays, cameras, optical combiners, and processors. The person skilled in the art will recognize many variations, alternatives, and modifications of embodiments of the present disclosure.

Figure 2:
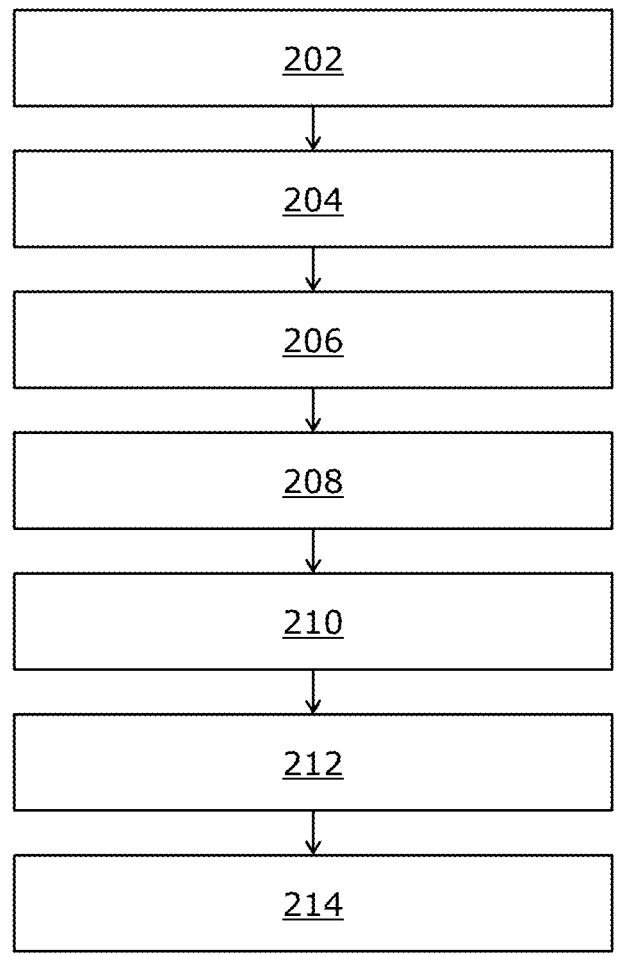
FIG. 2 illustrates steps of a method for automated calibration of a multiscopic display, in accordance with an embodiment of the present disclosure.

Referring to FIG. 2, illustrated are steps of a method for automated calibration of a multiscopic display, in accordance with an embodiment of the present disclosure. At step 202, an optical location of at least one camera relative to a display area of a multiscopic display is detected or retrieved, wherein the at least one camera is positioned such that the display area of the multiscopic display lies within a field of view of the at least one camera at least partially. At step 204, another optical location is selected, the another optical location being offset from the optical location of the at least one camera by a given angular interpupillary distance. At step 206, an estimated pitch of a multiscopic optical element of the multiscopic display is selected. At step 208, a first image and a second image are obtained, the first image and the second image are to be presented to a first viewer and a second viewer, wherein the first image has at least one first colour, and the second image has at least one second colour that is different from the at least one first colour. At step 210, a multiscopic image is generated from the first image and the second image, based on the estimated pitch, by considering the optical location and the another optical location as respective locations of the first viewer and the second viewer. At step 212, the multiscopic image is displayed via the multiscopic display, whilst at least one image of the display area is captured using the at least one camera. At step 214, a correct pitch of the multiscopic optical element is determined, based on an interference pattern represented in the at least one image.

The aforementioned steps are only illustrative and other alternatives can also be provided where one or more steps are added, one or more steps are removed, or one or more steps are provided in a different sequence without departing from the scope of the claims.

Figure 3A:
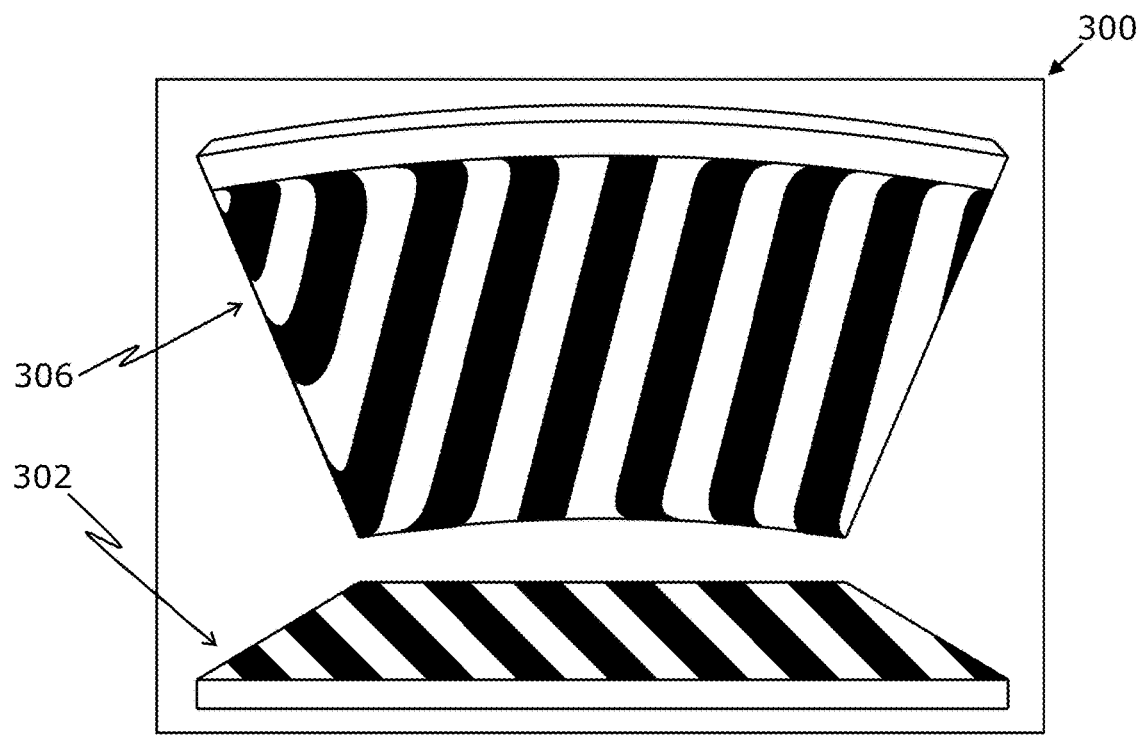
Figure 3B:
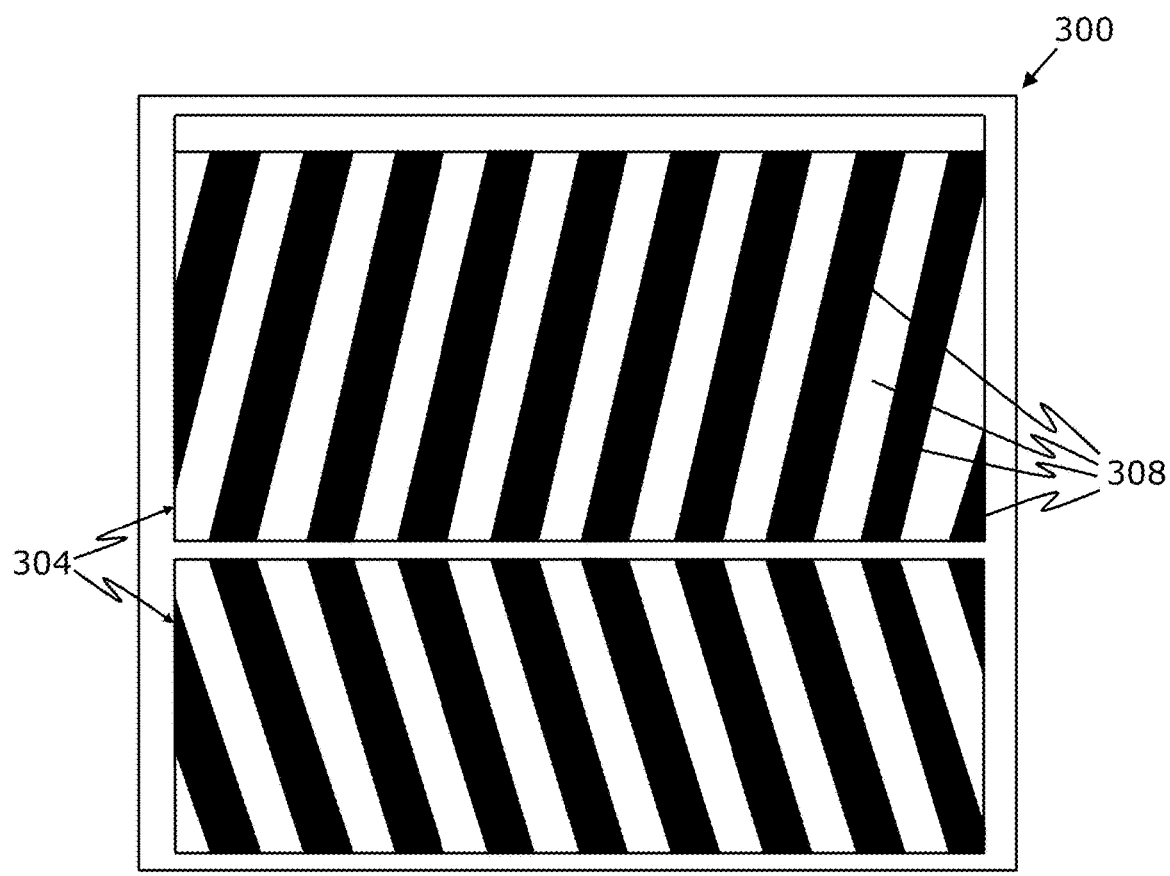
FIG. 3B illustrates a simplified example of an interference pattern represented in the image upon rectification, in accordance with an embodiment of the present disclosure.

Referring to FIGS. 3A and 3B, FIG. 3A illustrates a simplified example of an image 300 of a display area of a multiscopic display 302, while FIG. 3B illustrates a simplified example of an interference pattern 304 represented in the image 300 upon rectification, in accordance with an embodiment of the present disclosure. With reference to FIG. 3A, the image 300 represents the display area of the multiscopic display 302 as seen by at least one camera through a semi-reflective surface of an optical combiner 306, wherein the optical combiner 306 is arranged on an optical path of the multiscopic display 302, and wherein the at least one camera is employed to capture the image 300. A multiscopic image (not shown) is displayed via the multiscopic display 302, while the image 300 of the display area is captured using the at least one camera. The image 300 represents an interference pattern (that is separately shown in FIG. 3B, for sake of clarity and convenience only) based on which a correct pitch of a multiscopic optical element (not shown) of the multiscopic display 302 is determined.

With reference to FIG. 3B, there is shown the (rectified) image 300 generated by undistorting the image 300 shown in earlier FIG. 3A. In the earlier FIG. 3A, the interference pattern represented in the image 300 is distorted, for example, due to a curvature of the optical combiner 306. However, in FIG. 3B, the (rectified) image 300 represents the display area of the multiscopic display 302 and the interference pattern 304 without any distortion. The interference pattern 304 is shown to comprise interference beats 308 (for example, in form of stripes) of a first colour (depicted as a black colour) and a second colour (depicted as a white colour) arranged in an alternating manner. The interference pattern 304 is generated because an estimated pitch of the multiscopic optical element is incorrect.

Figure 4:
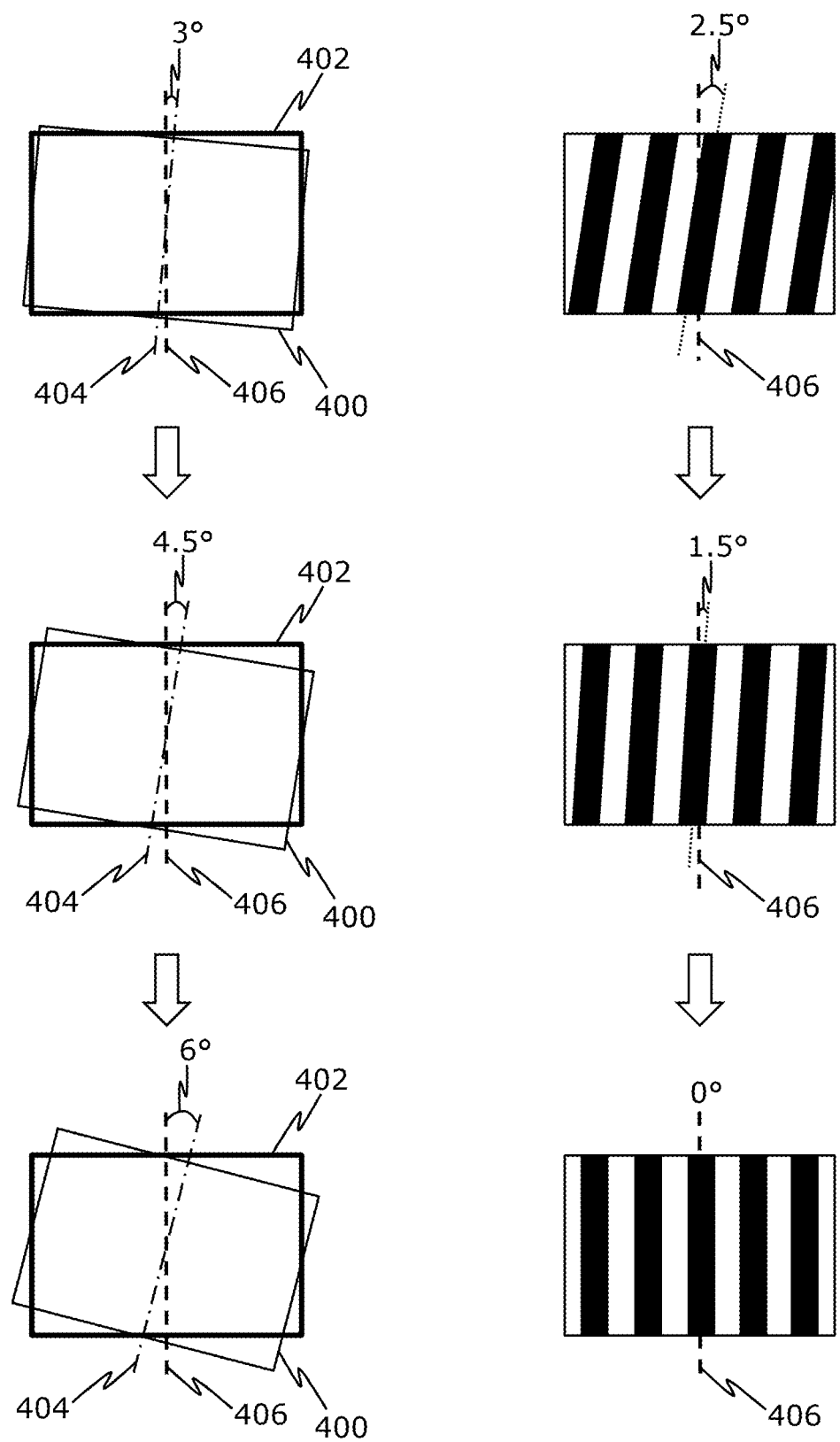
FIG. 4 illustrates an exemplary scenario of iteratively adjusting values of an estimated orientation of a multiscopic optical element of a multiscopic display, in accordance with an embodiment of the present disclosure.

Referring to FIG. 4, illustrated is an exemplary scenario of iteratively adjusting values of an estimated orientation of a multiscopic optical element 400 of a multiscopic display, in accordance with an embodiment of the present disclosure. For each iteration, there are shown an estimated orientation of the multiscopic optical element 400 with respect to a pixel array 402 of the multiscopic display, and a corresponding interference pattern resulting from a value of said estimated orientation, the corresponding interference pattern having a given beat orientation. Any orientation of the multiscopic optical element 400 is a rotational alignment of the multiscopic optical element 400 with respect to the pixel array 402. In other words, the orientation is a rotation of a longitudinal axis 404 (depicted using a dash-dot line) of the multiscopic optical element 400 with respect to a longitudinal axis 406 (depicted using a dashed line) of the pixel array 402, specifically, about a Z-axis (namely, a depth axis) of the multiscopic display. In a typical implementation, the longitudinal axis 404 of the multiscopic optical element 400 is slightly aligned with respect to the longitudinal axis 406 of the pixel array 402, for minimising visual artifacts (for example, such as aliasing effects or colour fringing). In a case where with each iteration, the interference pattern becomes less misaligned, when the beat orientation is moving closer towards 0 degree, it indicates that a direction (any of a clockwise direction and a counter-clockwise direction) in which the estimated orientation is being rotated is correct.

As shown, when different values of the estimated orientation are used in a sequence: 3 degrees, 4.5 degrees, 6 degrees, in a clockwise direction (from an initial value of the estimated orientation as 0 degree), a beat orientation in corresponding interference patterns is changed (i.e., reduced, for example, from an initial beat orientation of 4 degrees) in a sequence: 2.5 degrees, 1.5 degrees, 0 degree, respectively. This indicates that a direction (namely, the clockwise direction) in which the estimated orientation is rotated, is correct, and that the multiscopic optical element 400 is now accurately aligned with respect to the pixel array 402, at an angle of 6 degrees. For sake of clarity and better understanding only, angles for the estimated orientation and the beat orientation are exaggerated in FIG. 4 and are not drawn to scale.

Figure 5:
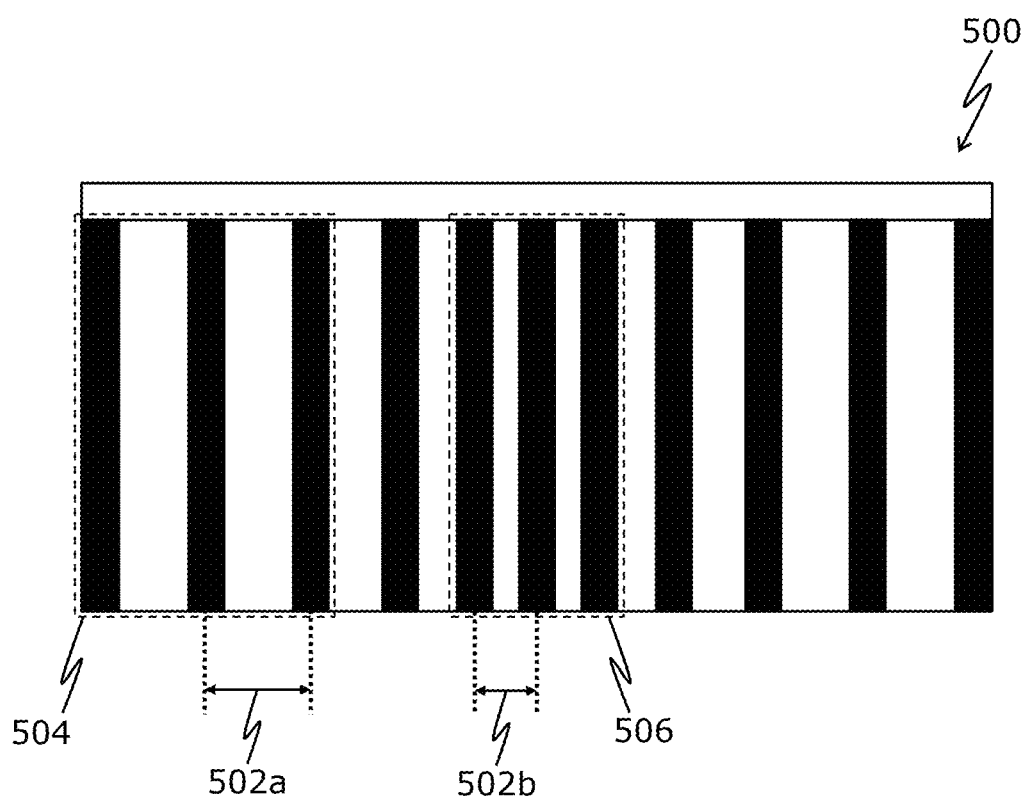
FIG. 5 illustrates an exemplary scenario of how a correct thickness of a multiscopic optical element of a multiscopic display is determined, in accordance with an embodiment of the present disclosure.

Referring to FIG. 5, illustrated is an exemplary scenario of how a correct thickness of a multiscopic optical element of a multiscopic display (not shown) is determined, in accordance with an embodiment of the present disclosure. There is shown an interference pattern 500 represented in an image that is captured (by at least one camera) when a multiscopic image is generated and displayed based on an estimated thickness of the multiscopic optical element. Using the interference pattern 500, at least one processor can determine a difference between a first frequency (i.e., a reciprocal of a first wavelength 502a) of interference beats 504 located towards an edge of the display area and a second frequency (i.e., a reciprocal of a second wavelength 502b) of interference beats 506 located at a centre of the display area. Then, the at least one processor can determine the correct thickness of the multiscopic optical element, based on the estimated thickness and the difference between the first frequency and the second frequency.

FIGS. 3A, 3B, 4, and 5 are merely examples, which should not unduly limit the scope of the claims herein. A person skilled in the art will recognize many variations, alternatives, and modifications of embodiments of the present disclosure.

The invention claimed is:

1. A system comprising:
a multiscopic display;
at least one camera that is positioned such that a display area of the multiscopic display lies within a field of view of the at least one camera at least partially; and
at least one processor configured to:
  detect or retrieve an optical location of the at least one camera relative to the display area;
  select another optical location that is offset from the optical location of the at least one camera by a given angular interpupillary distance;
  select an estimated pitch of a multiscopic optical element of the multiscopic display;
  obtain a first image and a second image to be presented to a first viewer and a second viewer, wherein the first image has at least one first colour, and the second image has at least one second colour that is different from the at least one first colour;
  generate a multiscopic image from the first image and the second image, based on the estimated pitch, by considering the optical location and the another optical location as respective locations of the first viewer and the second viewer;
  display the multiscopic image via the multiscopic display, whilst capturing at least one image of the display area using the at least one camera; and
  determine a correct pitch of the multiscopic optical element, based on an interference pattern represented in the at least one image.

2. The system of claim 1, wherein when determining the correct pitch, the at least one processor is configured to determine a frequency of an interference beat in the interference pattern, wherein the correct pitch is determined based further on the estimated pitch and the frequency of the interference beat in the interference pattern.

3. The system of claim 2, wherein when determining the correct pitch, the at least one processor is configured to rule out a wrong one out of two alternative values of the correct pitch, based on at least one of:
a pre-known approximate value of the correct pitch;
at least one repetition of the step of selecting the estimated pitch, the step of generating the multiscopic image, the step of displaying the multiscopic image, the step of capturing the at least one image and the step of determining the correct pitch, using at least one different value of the estimated pitch.

4. The system of claim 1, wherein the at least one processor is configured to:
rectify the at least one image by undistorting and cropping, to represent the display area only; and
analyse the interference pattern, based on a mapping between pixels of the first image with pixels of the at least one image, post rectifying.

5. The system of claim 4, further comprising an optical combiner arranged on an optical path of the multiscopic display, and wherein when rectifying, the at least one processor is configured to rectify the at least one image by also mirroring the at least one image, based on an optical path from the multiscopic display towards the at least one camera via the optical combiner.

6. The system of claim 1, wherein the at least one processor is configured to:
select an estimated phase of the multiscopic optical element relative to a pixel array of the multiscopic display, wherein the multiscopic image is generated based further on the estimated phase;
select a given interference beat that is closest to an origin of the at least one image;
determine a distance between the origin of the at least one image and a centre of a first part of the given interference beat having the at least one first colour; and
determine a correct phase of the multiscopic optical element relative to the pixel array of the multiscopic display, based on the estimated phase and said distance.

7. The system of claim 1, wherein the at least one processor is configured to:
select an estimated orientation of the multiscopic optical element relative to a pixel array of the multiscopic display, wherein the multiscopic image is generated based further on the estimated orientation;
determine a beat orientation in the interference pattern; and
determine a correct orientation of the multiscopic optical element relative to the pixel array of the multiscopic display, based on the estimated orientation and the beat orientation.

8. The system of claim 7, wherein when determining the correct orientation, the at least one processor is configured to rule out a wrong one out of two alternative directions in which the estimated orientation is to be rotated to reach the correct orientation, by:
repeating the step of selecting the estimated orientation, the step of generating the multiscopic image, the step of displaying the multiscopic image, the step of capturing the at least one image and the step of determining the beat orientation, using different values of the estimated orientation;
detecting a change in the beat orientation; and
adjusting the different values of the estimated orientation in a direction that is opposite to a direction of the change in the beat orientation.

9. The system of claim 7, wherein the at least one processor is configured to:
detect when an accuracy of the estimated pitch with respect to the correct pitch is less than an accuracy of the estimated orientation with respect to the correct orientation; and
when the accuracy of the estimated pitch is less than the accuracy of the estimated orientation,
  repeat the step of selecting the estimated pitch, the step of selecting the estimated orientation, the step of generating the multiscopic image, the step of displaying the multiscopic image, the step of capturing the at least one image, and the step of determining the beat orientation, using different values of the estimated pitch and a same value of the estimated orientation;
  detect another change in the beat orientation; and
  adjust the different values of the estimated pitch in a direction that is opposite to a direction of the another change in the beat orientation.

10. The system of claim 1, wherein the at least one processor is configured to:

select an estimated thickness of the multiscopic optical element in the multiscopic display, wherein the multiscopic image is generated based further on the estimated thickness;

determine a difference between a first frequency of interference beats located towards an edge of the display area and a second frequency of interference beats located at a centre of the display area; and determine a correct thickness of the multiscopic optical element, based on the estimated thickness and the difference between the first frequency and the second frequency.

11. The system of claim 1, wherein the at least one processor is configured to:

determine a plurality of angular interpupillary distances for a plurality of viewing distances; and select the given angular interpupillary distance from amongst the plurality of angular interpupillary distances.

12. A method comprising:

detecting or retrieving an optical location of at least one camera relative to a display area of a multiscopic display, wherein the at least one camera is positioned such that the display area of the multiscopic display lies within a field of view of the at least one camera at least partially;

selecting another optical location that is offset from the optical location of the at least one camera by a given angular interpupillary distance;

selecting an estimated pitch of a multiscopic optical element of the multiscopic display;

obtaining a first image and a second image to be presented to a first viewer and a second viewer, wherein the first image has at least one first colour, and the second image has at least one second colour that is different from the at least one first colour;

generating a multiscopic image from the first image and the second image, based on the estimated pitch, by considering the optical location and the another optical location as respective locations of the first viewer and the second viewer;

displaying the multiscopic image via the multiscopic display, whilst capturing at least one image of the display area using the at least one camera; and determining a correct pitch of the multiscopic optical element, based on an interference pattern represented in the at least one image.

13. The method of claim 12, wherein the step of determining the correct pitch comprises determining a frequency of an interference beat in the interference patter, wherein the correct pitch is determined based further on the estimated pitch and the frequency of the interference beat in the interference pattern.

14. The method of claim 13, wherein the step of determining the correct pitch comprises ruling out a wrong one out of two alternative values of the correct pitch, based on at least one of:

a pre-known approximate value of the correct pitch;

at least one repetition of the step of selecting the estimated pitch, the step of generating the multiscopic image, the step of displaying the multiscopic image, the step of capturing the at least one image and the step of determining the correct pitch, using at least one different value of the estimated pitch.

15. The method of claim 12, further comprising:

selecting an estimated phase of the multiscopic optical element relative to a pixel array of the multiscopic display, wherein the multiscopic image is generated based further on the estimated phase;

selecting a given interference beat that is closest to an origin of the at least one image;

determining a distance between the origin of the at least one image and a centre of a first part of the given interference beat having the at least one first colour; and determining a correct phase of the multiscopic optical element relative to the pixel array of the multiscopic display, based on the estimated phase and said distance.

16. The method of claim 12, further comprising:

selecting an estimated orientation of the multiscopic optical element relative to a pixel array of the multiscopic display, wherein the multiscopic image is generated based further on the estimated orientation;

determining a beat orientation in the interference pattern; and determining a correct orientation of the multiscopic optical element relative to the pixel array of the multiscopic display, based on the estimated orientation and the beat orientation.

17. The method of claim 16, wherein the step of determining the correct orientation comprising ruling out a wrong one out of two alternative directions in which the estimated orientation is to be rotated to reach the correct orientation, by:

repeating the step of selecting the estimated orientation, the step of generating the multiscopic image, the step of displaying the multiscopic image, the step of capturing the at least one image and the step of determining the beat orientation, using different values of the estimated orientation;

detecting a change in the beat orientation; and adjusting the different values of the estimated orientation in a direction that is opposite to a direction of the change in the beat orientation.

18. The method of claim 16, further comprising:

detecting when an accuracy of the estimated pitch with respect to the correct pitch is less than an accuracy of the estimated orientation with respect to the correct orientation; and when the accuracy of the estimated pitch is less than the accuracy of the estimated orientation, repeating the step of selecting the estimated pitch, the step of selecting the estimated orientation, the step of generating the multiscopic image, the step of displaying the multiscopic image, the step of capturing the at least one image, and the step of determining the beat orientation, using different values of the estimated pitch and a same value of the estimated orientation;

detecting another change in the beat orientation; and adjusting the different values of the estimated pitch in a direction that is opposite to a direction of the another change in the beat orientation.

19. The method of claim 12, further comprising:

selecting an estimated thickness of the multiscopic optical element in the multiscopic display, wherein the multiscopic image is generated based further on the estimated thickness;

determining a difference between a first frequency of interference beats located towards an edge of the display area and a second frequency of interference beats located at a centre of the display area; and determining a correct thickness of the multiscopic optical element, based on the estimated thickness and the difference between the first frequency and the second frequency.

* * * * *